United States Patent [19]

Wise

[11] 4,136,938
[45] Jan. 30, 1979

[54] OPTICAL PROJECTION APPARATUS

[75] Inventor: David S. Wise, Solon, Ohio

[73] Assignee: McGraw-Hill, Inc., New York, N.Y.

[21] Appl. No.: 825,172

[22] Filed: Aug. 16, 1977

[51] Int. Cl.² .............................................. G03B 21/28
[52] U.S. Cl. ........................................ 353/78; 353/99
[58] Field of Search ................... 353/77, 78, 74, 75, 353/79, 99

[56] References Cited

U.S. PATENT DOCUMENTS

| | | | |
|---|---|---|---|
| D. 200,823 | 4/1965 | Wells | D61/1 |
| D. 209,246 | 11/1967 | Wells | D61/1 |
| 1,390,445 | 9/1921 | Jenkins | 353/98 |
| 1,988,522 | 1/1935 | Stanley | 353/73 |
| 2,604,005 | 7/1952 | Hahn | 353/98 |
| 2,767,611 | 10/1956 | Fitzgerald | 353/73 |
| 3,247,762 | 4/1966 | Peters | 353/73 |
| 3,381,574 | 5/1968 | Wells | 353/61 |
| 3,437,804 | 4/1969 | Schaefer et al. | 353/82 |
| 3,479,116 | 11/1969 | Anderson | 353/77 |
| 3,488,115 | 1/1970 | Nemec et al. | 353/73 |

FOREIGN PATENT DOCUMENTS 676102  11/1929  France ............................ 353/79

*Primary Examiner*—Steven L. Stephan
*Attorney, Agent, or Firm*—Flynn & Frishauf

[57] ABSTRACT

An optical projection apparatus having foldable mirror members which permit the apparatus to be folded into a rigid, compact assembly for ease of installation and transportation. The apparatus comprises a double triangulated optical mirror structure which is interdependently mounted with the projector and screen without reference to the base section. The double triangulated structure provides the required optical rigidity while also folding or collapsing of the apparatus to reduce critical outer dimensions.

33 Claims, 9 Drawing Figures

U.S. Patent Jan. 30, 1979 4,136,938
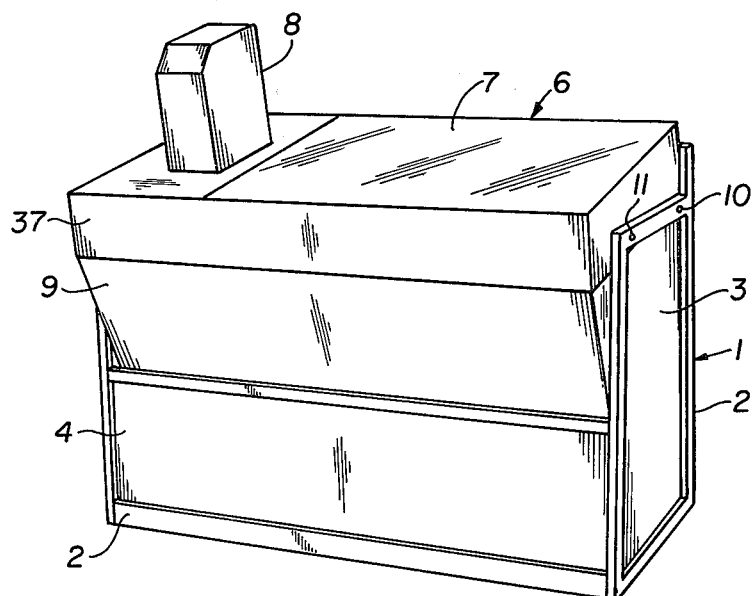
FIG.1
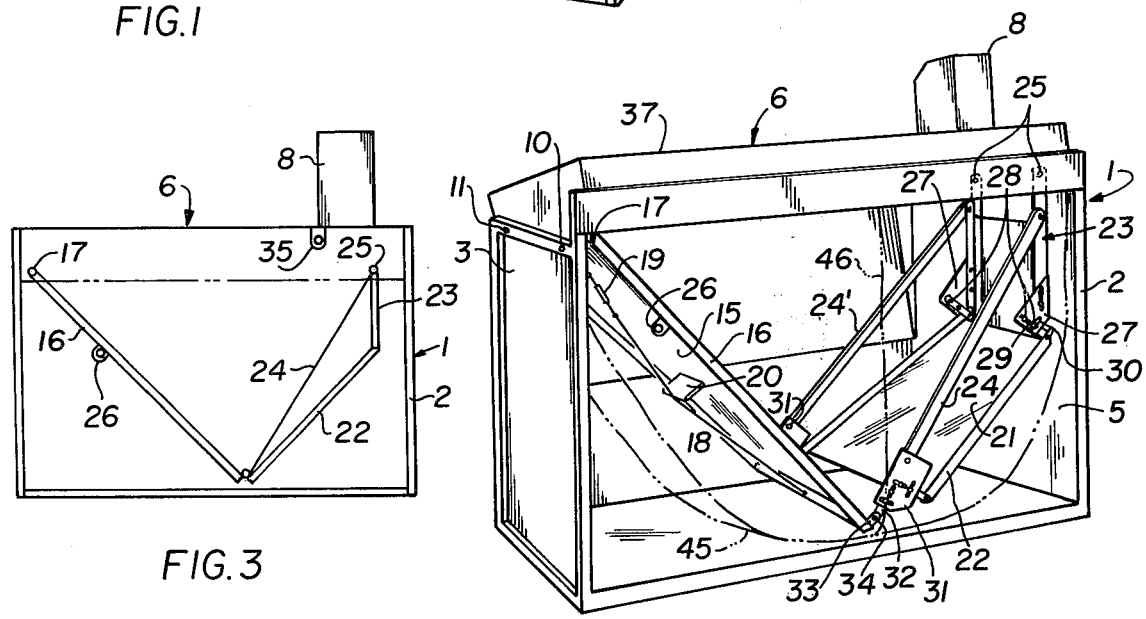
FIG.3
FIG.2
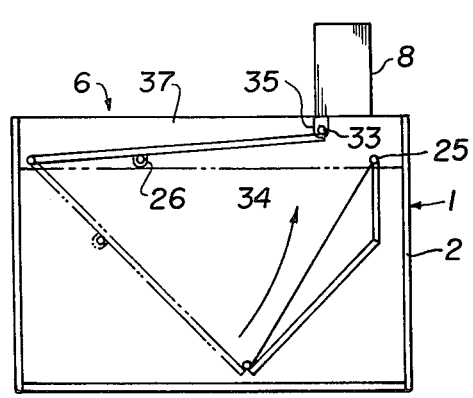
FIG.4
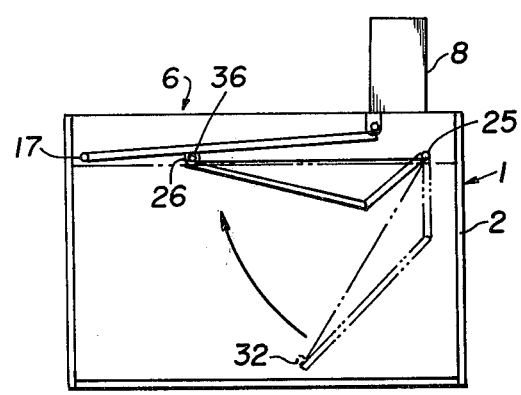
FIG.5

U.S. Patent  Jan. 30, 1979  Sheet 2 of 2  4,136,938
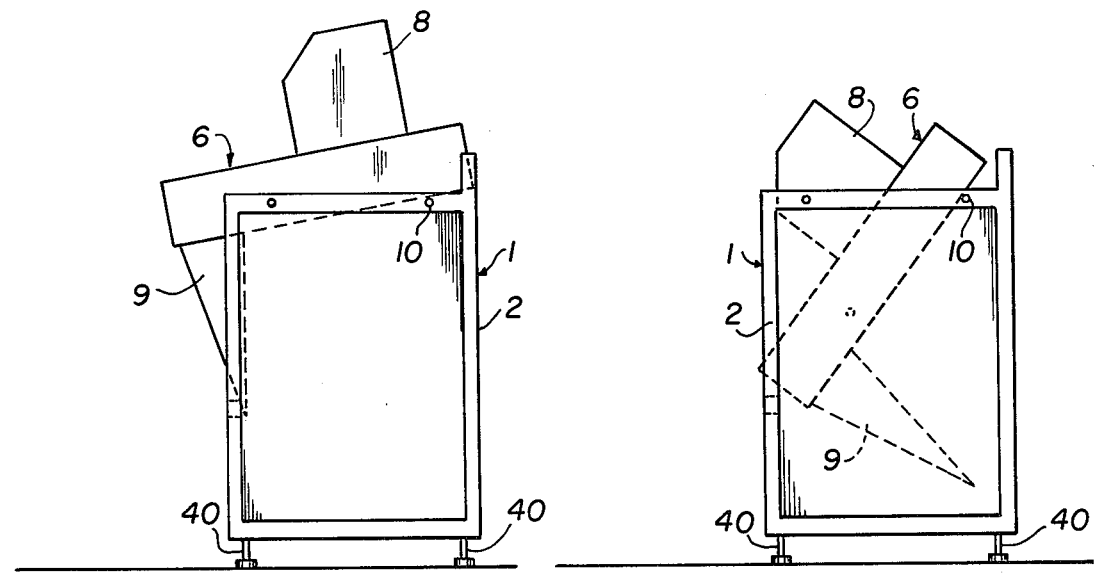
FIG.6
FIG.7
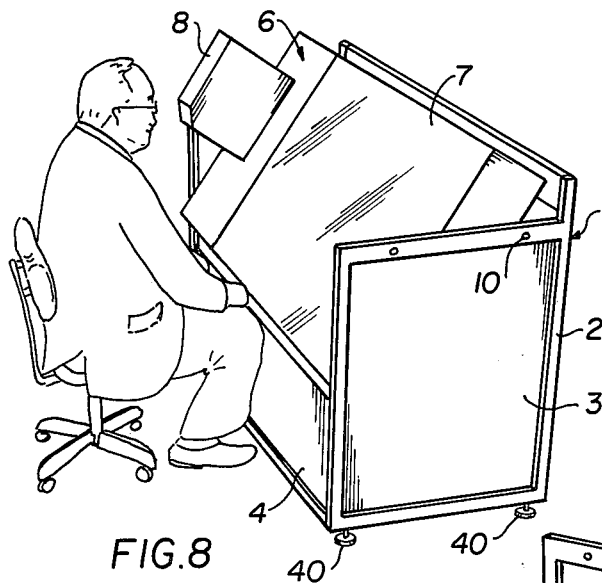
FIG.8
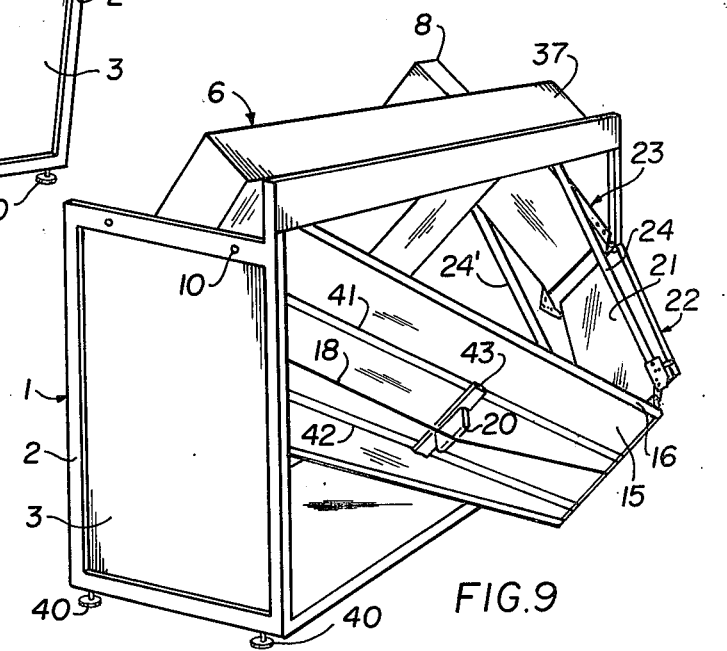
FIG.9

OPTICAL PROJECTION APPARATUS

The present invention relates to optical projection apparatus, and more particularly to such apparatus which has foldable portions to reduce critical outer dimensions for ease of installation and transportation.

BACKGROUND OF THE INVENTION

One of the major problems in apparatus of the type to which the present invention pertains is to design a system which provides a large viewing screen, but yet which may be easily transported and installed, and which may be easily passed through a doorway. For example, in a typical system the viewing screen is 30 inches from the front to the back. Early designs of such systems have limited the outer dimension from front to back to approximately 32 inches. However, it is not possible to pass such prior art viewers through a doorway that is less than 32 inches wide.

It is the object of the present invention to provide an optical viewer which has a large screen, but yet which is collapsible to a size substantially smaller than the size of the screen so that the apparatus may be passed through a doorway that is narrower than the dimension of the screen. It is a further object of the present invention to provide such a collapsible apparatus which still maintains required optical rigidity for proper optical reproduction on the large viewing surface, which is easily manufactured, and which is easily collapsed and set up.

SUMMARY OF THE INVENTION

In accordance with the present invention, an optical projection system comprises a housing, a projector, and a screen associated with said projector on which the optical image is viewed. Additionally, two mirrors are interdependently mounted relative to the projector and screen, but without reference to the housing section of the apparatus. The mirrors are arranged in a double triangulated structure, the mirrors being pivotable relative to the screen. The screen is further movable relative to the housing of the apparatus whereby the mirrors are folded toward the screen and the screen is then movable relative to the housing to at least partially nest same in the housing to provide a more compact structure for transportation and/or installation.

In accordance with a feature of the invention, the apparatus provides a slightly inclined screen during normal use, and provides a greatly inclined screen, when the screen section is moved relative to the housing for nesting thereof in the housing, to enable viewing in a sit-down position. Still further, in accordance with a feature of the invention, the triangulated mirror structure is provided with adjustment means to enable the mirrored structure to be precisely aligned either at the factory or at the site of use. The mirrors, in their folded positions, are preferably firmly secured to the screen section to prevent damage thereto during transportation.

In accordance with a further feature, the complete optical section which includes the mirrors, is enclosed by a bag-like structure which is openable to provide access for servicing and/or folding of the mirrors. The bag-like structure keeps out dust and other foreign matter.

BRIEF DESCRIPTION OF THE DRAWINGS

FIG. 1 is a perspective view of an optical viewing apparatus according to the present invention;

FIG. 2 is a rear view with the back panel removed, of the apparatus of the present invention, showing the mounting of the mirror assembly to the swingable upper portion of the apparatus;

FIG. 3 is a rear view, in simplified form, of the apparatus of the present invention with the back panel removed, showing the optical mirror assembly in its operative position;

FIG. 4 is a rear view of the simplified form of FIG. 3, showing the optical mirror assembly in its partially folded state;

FIG. 5 is a rear view of the simplified form of FIG. 3 showing the optical mirror assembly in its fully folded or collapsed state;

FIG. 6 is a side view of the apparatus of the present invention showing the size thereof when in its normal operative condition;

FIG. 7 is a side view, similar to FIG. 6, showing the apparatus with the optical assembly nested into the main framework of the housing to reduce the overall size for ease of movement thereof.

FIG. 8 illustrates the apparatus of the present invention with the optical assembly nested as shown in FIG. 7 but with the mirrors unfolded to their operative positions to permit sit-down viewing; and FIG. 9 is a rear view of the apparatus when in the condition illustrated in FIG. 8.

DETAILED DESCRIPTION

Referring to FIGS. 1 and 2, an optical projection apparatus of the present invention comprises a lower housing or base section 1 which, in the illustrated embodiment, is comprised of a framework 2 with removable panels 3, 4 and 5 (FIG. 2). The apparatus further comprises an upper screen or optical section 6 which has a viewing screen 7, a projection head 8 and a shroud 9 which serves as a protective and decorative member for an otherwise open portion of the lower housing 1. The optical section 6 is pivotally mounted to the lower frame 1 by means of pivot bolts or pins 10 which are located on both the left and right sides of the apparatus. Further provided are removable bolts or pins 11 which, when removed, permit pivoting of the optical section 6 relative to the base 1 about the pivots 10, as shown for example in FIGS. 6 and 7. The projection head 8 may be a conventional commercially available microfilm projection head, or may be a Model 40 projection head manufactured by Systems Thirty-Five Company, division of Tameran, Inc., Solon, Ohio.

FIG. 2 is a rear view of the apparatus with the rear panel removed, and FIGS. 3-5 are simplified views thereof, so as to better illustrate the collapsible or foldable double triangulated mirror structure in accordance with the present invention. A large mirror 15 is mounted in a frame 16 which is pivotally mounted to the upper portion of the optical section. for example by means of pivot pins 17 located at opposite sides of frame 16. The frame 16 has a wire, or the like 18 secured at opposing ends thereof and having a turnbuckle 19 connected in a portion of the wire 18 as shown, or at an end of the wire 18. A spacer 20 is provided to space the wire 18 from the back of the mirror 15. Upon tightening or loosening of the turnbuckle 19, the planarity of the mirror 15 may be varied in order to remove any optical distortion which may be present in the viewed image on the screen 7.

A second mirror 21 is mounted in a framework 22 which forms one leg of a triangle. The framework 22 is rigidly connected to a second framework 23 which forms a second leg of a triangle, at best seen in FIGS. 3-5. Frame members 24, 24 connect frameworks 22 and 23 so as to form a third leg of the triangle with frameworks 22 and 23. The framework 23 is pivotally connected to the upper portion of optical section 6 by means of pivot bolts or pins 25 which connect with ears (not shown) extending down from the upper portion of optical section 6.

Framework 23 is connected with framework 22 via two plates 27 and bolts 28. Various slots or elongated openings may be provided in the plate 27 and/or the connecting portions of the framework 22, 23 so as to permit a small degree of adjustment in the relative positions of the frameworks 22 and 23. A typical slot is shown, for example, at 29 on plate 27. A cross-slot 30 may be formed in plate 27 so as to provide a still further degree of relative adjustment. Similar slots may be provided for all of the bolt connections 28 between the plate 27 and frameworks 22, 23. Similar slots and cross-slots are provided in plates 31 to permit relative adjustment between the frame 16 and the triangular framework comprising frame members 22, 23 and 24. An ear 32 is adjustably connected to the plates 31 via the bolts and slots, and is adapted to be rigidly connected to an ear 33 projecting from the frame 16 by means of a bolt 34, as shown in FIG. 2. Frame 16 may be adjustably connected to the upper portion of the optical section 6 by means of various bolts and slots in order to provide relatively simple alignment of the system.

Referring to FIGS. 3-5, the system collapses as described below. First, the bolts 34 are removed to permit the framework 16 to swing upwardly to the position shown in solid lines in FIG. 4. At this point, the ear 33 is bolted to ear 35 by means of bolt 34 at each side of the frame 16. Next, the triangular small mirror section is swung upward about pivot 25 to the position shown in FIG. 5 whereby the ear 32 is connected to the ear 26 by means of a bolt 36. This rigidly locks both mirrors in position to the upper housing 37 of the optical section 6. Next, the bolts 11 from both sides of the base member are removed, permitting the optical housing 6 to be pivoted about the pivot pin or bolt 10 to the position shown in FIG. 7. By virtue of the double triangulated structure, a very rigid optical system is provided which has high structural integrity when it is folded as well as in its unfolded condition, and which retains the relative positions between the members so that when in its unfolded condition for optical viewing, the mirrors are always connected in the same relative position with respect to each other as well as with respect to the remainder of the optical system, thereby providing a high degree of reliability even after the machine is collapsed for transportation, or the like. If any misalignment occurs, such misalignment can be corrected by means of the various slotted arrangements interconnecting the various elements of the frames.

In the above description, a first triangle is formed by frameworks 22, 23 and members 24, 24', as clearly seen in FIGS. 2-5. The second triangle comprises the framework 16 as one leg, the triangular structure of members 22, 23, 24, 24', as a second leg thereof, and the rigid optical housing section 37 effectively forming the third leg of the second triangle.

As shown in FIGS. 6 and 7, legs 40 may be provided so as to provide a more convenient position of the screen 7 for sit-down viewing, as shown in FIG. 8. The legs 40 may be adjustable in height and may be collapsible into the lower housing 1 to lower the apparatus for stand-up viewing in the positions shown in FIG. 1.

FIG. 9 is a rear view of the apparatus showing the mirrors folded out to their operational state while the optical system 6 is tilted downward to the position shown in FIGS. 7 and 8.

FIG. 9 shows a modification to the means for correcting the curvature of the mirror 15. As shown in FIG. 9, the spacer member 20 may be mounted to tracks 41, 42 either directly or through an intermediate member 43 which is slideable along the tracks 41. The tracks 41 may merely comprise rigid frame members which are a portion of frame 16, along which member 43 may be positioned. Depending upon the position of the spacer 20 and intermediate member 43, various adjustments in the curvature of the mirror 15 may be made to correct certain types of distortion which may appear on screen 7. The turnbuckle connected to wire 18 is hidden by the panel 3 and FIG. 9.

As shown in FIGS. 1 and 6, the shroud 9 is attached to the optical section 6 and serves to fill the gap in the lower housing between the lower front panel 4 and the optical section 6. When the optical section 6 is folded downward to its sit-down viewing position as shown in FIG. 8, the front end portion of optical section 6 meets the lower front panel portion 4 of the lower housing and the shroud 9 is nested inside the lower housing, as shown in FIG. 7. cleaning, mirrors.

A bag-like structure 45 is connected to the upper housing 37 and extends downward to cover the mirrors to prevent dust, etc. from entering the optical system. A zipper closure 46 is provided for the bag 45 to permit access to the optical mirror system for cleaning, servicing and folding of the morrirs. See FIG. 2.

While the invention has been described above with respect to specific apparatus and with respect to a specific embodiment, it should be clear that various modifications and alterations could be implemented within the scope of the invention as set forth in the claims. For example, the triangulated structure comprising members 22, 23 and 24 may be made into a more complex structure which permits proper positioning of the small mirror, as wella s easy adjustment of the positioning thereof and apropriate structural integrity. well as

I claim:

1. An optical projection system comprising:
   a lower housing; and
   an optical section pivotally connected to said lower housing, said optical section including:
   an upper housing having a projector mounted thereon, and a screen for viewing an image generated by said projector;
   a first mirror pivotally connected to said upper housing and in optical communication with said projector;
   a second mirrors; and
   connecting means for pivotally connecting said second mirror at one end thereof to said upper housing, and for selectively connecting said second mirror at another end thereof to said first mirror such that said first and second mirrors substantially form adjacent legs of a generally triangular structure formed of at least said first and second mirrors, said connecting means adjustably connecting said first and second mirrors together so that the relative positions of the first and second mirrors are adjustable;

said second mirror being in optical communication with both said first mirror and said screen, whereby an image emanating from said projector is projected on said screen via said two mirrors.

2. An optical projection system according to claim 1 wherein said first mirror, second mirror and upper housing comprise respective legs of said generally triangular structure.

3. An optical projection system according to claim 2 wherein said first mirror is mounted to a triangular framework, said triangular framework comprising one leg of said generally triangular structure and being pivotally mounted to said upper housing and selectively connected to said first mirror.

4. An optical projection system according to claim 1 wherein said first mirror is mounted in a triangular framework, said triangular framework being pivotally mounted to said upper housing and selectively connected to said first mirror.

5. An optical projection system according to claim 1 wherein said connecting means includes means for adjustably connecting said second mirror to said upper housing for varying the relative positions thereof.

6. An optical projection system according to claim 1 wherein said projector is mounted at one end of said upper housing and said screen is mounted adjacent said projector.

7. An optical projection system according to claim 1 comprising means for adjusting the planarity of at least one of said mirrors to compensate for distortion in an image viewed on said screen.

8. An optical projection system according to claim 7 wherein said adjusting means comprises an elongated means connected to end portions of said at least one mirror and a spacer between an intermediate portion of said elongated means and the rear of said at least one mirror, said elongated means being adjustable in length.

9. An optical projection system according to claim 8 further comprising turnbuckle means coupled to said elongated means for adjusting the length thereof.

10. An optical projection system according to claim 1 wherein said upper housing comprises means for connecting a free end of at least one of said mirrors to said upper housing when said at least one mirror is disconnected from the other mirror and is pivoted toward said upper housing.

11. An optical projection system according to claim 10 wherein said other mirror has means for connecting a free end thereof to at least one mirror when it is pivoted toward said upper housing.

12. An optical projection system according to claim 1 comprising means for retaining said optical section in a normally generally horizontal position, and means for retaining said optical system in a vertically inclined position when it is pivoted relative to said lower housing.

13. An optical projection system according to claim 1 comprising means for adjustably connecting at least one of said mirrors to said upper housing.

14. An optical projection system according to claim 13 further comprising means for adjustably connecting said first and second mirrors together at a free end thereof.

15. An optical projection system according to claim 1 further comprising means enclosing said mirrors to prevent dust, etc. from entering the optical system.

16. An optical projection system according to claim 15 wherein said enclosing means comprises a flexible bag-like structure attached to said upper housing and having an openable portion to permit access to said mirrors and optical system.

17. An optical projection system according to claim 1 wherein said optical section is pivotable relative to said lower housing between a first position in which said screen is generally horizontal and a second position wherein said screen is vertically inclined, and said lower housing includes a removable rear panel to permit arrangement of said first and second mirrors in their projection positions when said optical section is pivoted to the vertically inclined position, said mirrors projecting at least partially out of the rear section of said lower housing.

18. An optical projection system according to claim 1 wherein said first and second mirrors extend downwardly toward said lower housing.

19. An optical projection system comprising:
a lower housing;
an optical section pivotally connected to said lower housing; and
means for selectively retaining said optical section in a first position relative to said lower housing, said optical section, when not being retained in said first position, being pivotable relative to said lower housing to a second position relative to said lower housing;
said optical section comprising:
an upper housing having a projector mounted thereon, and a screen for viewing an image generated by said projector, said screen being generally horizontally oriented when said optical section is in its first position relative to said lower housing and being in a vertically inclined position when said optical section is pivoted relative to said lower housing;
a first triangular framework pivotally connected in the vicinity of an apex of said first triangular framework to said upper housing, and being foldable toward and away from said upper housing;
a first mirror carried in said triangular framework and forming, in end view, a side of the triangle of said triangular framework;
a second mirror,
means for pivotally connecting said second mirror at one end thereof to said upper housing at a position spaced from the pivotal connection of said triangular framework such that said second mirror is pivotably movable toward and away from said upper housing;
said second mirror being in optical communication with both said first mirror and said screen, whereby an image emanating from said projector is projected on said screen via said two mirrors; and
means for selectively connecting the free end of said second mirror to said triangular framework in the vicinity of another apex of said triangular framework, said second mirror, triangular framework and upper housing forming respective legs of another triangle when said second mirror is connected to said triangular framework.

20. An optical projection system according to claim 19 wherein said means for pivotally connecting said one end of said second mirror to said upper housing comprises a further framework carrying said second mirror, the further framework being pivotally connected to said upper housing at one end to thereby pivotally connect said one end of said second mirror to said upper housing, and the further framework being selectively connected to said triangular framework at the other end thereof to thereby connect said free end of said second mirror to said triangular framework.

21. An optical projection system according to claim 19 wherein at least one of said second mirror and triangular framework is adjustably connected to said upper housing to adjust the relative positions thereof.

22. An optical projection system according to claim 21 wherein said second mirror is adjustably and selectively connected to said triangular framework to adjust the relative position thereof.

23. An optical projection system according to claim 19 wherein said second mirror is adjustably and selectively connected to said triangular framework to adjust the relative position thereof.

24. An optical projection system according to claim 19 wherein said upper housing includes means for retaining said second mirror when said second mirror is disconnected from said triangular framework and is pivoted toward said upper housing, and said second mirror comprises means for retaining said triangular framework when said triangular framework is pivoted toward said upper housing, thereby retaining said first and second mirrors in a collapsed condition relative to said upper housing and permitting said upper housing to be pivoted to a vertically inclined position relative to said lower housing.

25. An optical projection system according to claim 24 wherein said lower housing includes a removable rear panel to permit unfolding of said second mirror and triangular framework when said optical section is pivoted to its vertically inclined position, thereby permitting sit-down viewing of the screen.

26. An optical projection system according to claim 19 wherein said lower housing includes a removable rear panel to permit assembly of said second mirror and triangular framework to their projection positions when said optical section is pivoted to the position where the screen is vertically inclined, thereby permitting sit-down viewing of the screen.

27. An optical projection system according to claim 19 wherein said first and second mirrors extend downwardly toward said lower housing.

28. An optical projection system comprising:
a lower housing; and
an optical section pivotally connected to said lower housing, said optical section including:
  an upper housing having a projector mounted thereon, and a screen for viewing an image generated by said projector;
  a first mirror pivotally connected to said upper housing and in optical communication with said projector; and
  a second mirror having one end pivotally connected to said upper housing and another end selectively connected to said first mirror, said second mirror being in optical communication with both said first mirror and said screen, whereby, an image emanating from said projector is projected on said screen via said two mirrors;
  said upper housing including means for connecting a free end of at least one of said mirrors to said upper housing when said first mirror is disconnected from said second mirror and said at least one mirror is pivoted toward said upper housing, the other of said mirrors having means for connecting a free end thereof to said at least one mirror when it is pivoted toward said upper housing.

29. An optical projection system according to claim 28 further comprising means for enclosing said mirrors to prevent dust, etc. from entering the optical system.

30. An optical projection system according to claim 29 wherein said enclosing means comprises a flexible bag-like structure attached to said upper housing and having an openable portion to permit access to said mirrors and optical system.

31. An optical projection system according to claim 28 wherein said first and second mirrors extend downwardly toward said lower housing.

32. An optical projection system comprising:
a lower housing; and
an optical section pivotally connected to said lower housing, said optical section including:
  an upper housing having a projector mounted thereon, and a screen for viewing an image generated by said projector;
  a first mirror pivotally connected to said upper housing and in optical communication with said projector;
  a second mirror having one end pivotally connected to said upper housing and another end selectively connected to said first mirror, said second mirror being in optical communication with both said first mirror and said screen, whereby an image emanating from said projector is projected on said screen via said two mirrors; and
  means for enclosing said mirrors to prevent dust, etc. for entering the optical system, said enclosing means comprising a flexible bag-like structure attached to said upper housing and having an openable portion to permit access to said mirrors and optical system.

33. An optical projection system according to claim 32 wherein said first and second mirrors extend downwardly toward said lower housing.

* * * * *

UNITED STATES PATENT AND TRADEMARK OFFICE
CERTIFICATE OF CORRECTION

PATENT NO. : 4,136,938
DATED : January 30, 1979
INVENTOR(S) : David S. WISE

It is certified that error appears in the above-identified patent and that said Letters Patent are hereby corrected as shown below:

Column 8, line 15, change "leat" to --least--.

Signed and Sealed this

First Day of May 1979

[SEAL]

Attest:

RUTH C. MASON
Attesting Officer

DONALD W. BANNER
Commissioner of Patents and Trademarks